(12) United States Patent
Nambu

(10) Patent No.: US 6,637,599 B1
(45) Date of Patent: Oct. 28, 2003

(54) DEVICE FOR MONITORING THE NORMAL OPERATION OF AN APPARATUS FOR DETECTING A PHYSICAL CHARACTERISTIC OF CHICKEN EGGS

(75) Inventor: Kunio Nambu, Nagaokakyo (JP)

(73) Assignee: Kabushiki Kaisha Naberu, Kyoto (JP)

( * ) Notice: Subject to any disclaimer, the term of this patent is extended or adjusted under 35 U.S.C. 154(b) by 0 days.

(21) Appl. No.: 09/701,425

(22) PCT Filed: Feb. 18, 2000

(86) PCT No.: PCT/JP00/00936

§ 371 (c)(1),
(2), (4) Date: Nov. 29, 2000

(87) PCT Pub. No.: WO00/65312

PCT Pub. Date: Nov. 2, 2000

(30) Foreign Application Priority Data

Apr. 23, 1999 (JP) .............................. 11-155590

(51) Int. Cl.[7] .......................... A01K 43/08; G01N 19/08
(52) U.S. Cl. ........................ 209/513; 209/510; 73/865.9
(58) Field of Search ................................. 209/513, 510, 209/511, 516, 1, 2; 73/865.9, 1.01, 65.09, 655, 112, 156, 863, 863.01; 356/52, 53, 54, 433, 434, 237.1, 239.1, 237.2, 243.4; 374/137; 700/73

(56) References Cited

U.S. PATENT DOCUMENTS

| | | | |
|---|---|---|---|
| 3,898,435 A | * 8/1975 | Pritchard et al. ............. | 177/50 |
| 4,182,571 A | * 1/1980 | Furuta et al. ................. | 356/53 |
| 4,765,124 A | 8/1988 | Nakamura .................... | 53/502 |
| 4,872,564 A | 10/1989 | Van der Schoot ........... | 209/511 |
| 5,616,824 A | * 4/1997 | Abdel-Malek et al. ....... | 73/1.01 |
| 5,621,158 A | * 4/1997 | Kitamura et al. ............ | 73/1.01 |
| 6,343,234 B1 | * 1/2002 | Thomas ....................... | 700/28 |
| 6,351,676 B1 | * 2/2002 | Thomas ....................... | 700/28 |

FOREIGN PATENT DOCUMENTS

| | | | |
|---|---|---|---|
| EP | 0280436 A2 | * 8/1988 | ............ G07D/7/00 |
| EP | 295755 A2 | * 12/1988 | .......... A01K/43/00 |
| GB | 2187277 A | * 9/1987 | ............ B07C/5/342 |
| JP | 5-142000 | 6/1993 | ............ G01D/21/00 |
| JP | 9-23481 | 1/1997 | ............. H04Q/9/00 |
| JP | 11-56159 | 3/1999 | .......... A01K/43/00 |

* cited by examiner

Primary Examiner—Donald P. Walsh
Assistant Examiner—Mark J. Beauchaine
(74) Attorney, Agent, or Firm—Nixon & Vanderhye P.C.

(57) ABSTRACT

A device for monitoring the normal operation of weighing instruments (X1, X2, and X3) for chicken eggs used in a weight grading apparatus A for chicken eggs has a judging device 12 for monitoring the normal and abnormal operation of the weighing instruments (X1, X2, and X3) depending on whether or not the weight detected by the weighing instruments (X1, X2, and X3) indicates a predetermined state, as well as a display 13 for outputting a result of judgement by the judging device 12.

10 Claims, 5 Drawing Sheets

FIG.2

| SIZE | WEIGHT g (OR MORE, LESS THAN) | | NO. OF EGGS | PROPORTION |
|---|---|---|---|---|
| 3S |  | 40 | 127 | 0.70 |
| 2S | 40 | 46 | 174 | 0.96 |
| S | 46 | 52 | 275 | 1.52 |
| MS | 52 | 58 | 1935 | 10.70 |
| M | 58 | 64 | 4314 | 23.86 |
| L | 64 | 70 | 6311 | 34.90 |
| 2L | 70 | 76 | 3873 | 21.42 |
| 3L | 76 |  | 1075 | 5.94 |
|  | TOTAL | | 18084 | 100.00 |

FIG.4

| CRACKING DEGREE | NO. OF CUMULATIVE SUM | CUMULATIVE SUM % | NO. OF EGGS IN RANGE | RANGE % |
|---|---|---|---|---|
| 10 | 7 | 0.14 | 7 | 0.14 |
| 9 | 14 | 0.28 | 7 | 0.14 |
| 8 | 28 | 0.56 | 14 | 0.28 |
| 7 | 70 | 1.41 | 42 | 0.85 |
| 6 | 168 | 3.39 | 98 | 1.98 |
| 5 | 281 | 5.67 | 113 | 2.28 |
| 4 | 540 | 10.89 | 259 | 5.22 |
| 3 | 995 | 20.07 | 455 | 9.18 |
| 2 | 1,576 | 31.79 | 581 | 11.72 |
| 1 | 2,493 | 50.29 | 917 | 18.50 |
| 0 | 4,957 | 100.00 | 2,464 | 49.71 |

DEVICE FOR MONITORING THE NORMAL OPERATION OF AN APPARATUS FOR DETECTING A PHYSICAL CHARACTERISTIC OF CHICKEN EGGS

This application is the U.S. national phase of international application PCT/JP00/00936, filed Feb. 18, 2000, which designated the U.S.

TECHNICAL FIELD

The present invention relates to a device for monitoring the normal operation of an apparatus for detecting a physical characteristic of chicken eggs, and more particularly to a device for monitoring the normal operation of a weighing apparatus, a cracked-egg detecting apparatus, and a bloodspotted-egg detecting apparatus.

BACKGROUND ART

To grade eggs according to, for example, various weight ranges (sizes), including LL, L, M, MS, S, SS, and irregular size, which constitute one of their physical characteristics, it is necessary to detect the weight of the respective eggs. A conventional egg grading apparatus is arranged such that a comparator compares data on individual egg weight obtained from a weighing instrument with boundary value settings of a boundary-egg-weight setting device so as to determine sizes of the respective eggs, and the eggs whose sizes have been thus determined are distributed and conveyed to predetermined collection sites. In such a conventional grading apparatus, the monitoring of the data from the weighing instrument is effected only to such an extent that in a case where egg weight data which is nonexistent as an egg, e.g., 1 kg or the like, has been received by the comparator, an error signal is outputted instead of a size signal.

In such monitoring, when the weighing instrument is abnormal and even if the egg weight is measured to be 2 g heavier than a proper value, the weighing instrument is not determined to be abnormal unless the egg weight is received as egg weight data which is nonexistent as an egg, as described above.

The present invention has been devised in view of the above-described circumstances, and its object is to provide a normal-operation monitoring device which makes it possible to easily estimate whether a physical-characteristic detecting apparatus is operating normally.

DISCLOSURE OF INVENTION

A device for monitoring the normal operation of a physical-characteristic detecting apparatus for chicken eggs in accordance with the present invention is a device for monitoring the normal operation of a physical-characteristic detecting apparatus for chicken eggs which is used in an apparatus for grading chicken eggs, comprising: judging means for monitoring the normal and abnormal operation of the physical-characteristic detecting apparatus depending on whether or not information detected by the physical-characteristic detecting apparatus or determination information obtained by making a determination on the information indicates a predetermined state; and judgement-result outputting means for outputting a result of judgement by the judging means.

In addition, a device for monitoring the normal operation of a physical-characteristic detecting apparatus for chicken eggs in accordance with the present invention is a device for monitoring the normal operation of a physical-characteristic detecting apparatus for chicken eggs for detecting a physical characteristic of chicken eggs which are conveyed orderly in a multiple-row arrangement, comprising: storage means for storing information detected by the physical-characteristic detecting apparatus or determination information obtained by making a determination on the information; judging means for monitoring the normal and abnormal operation of the physical-characteristic detecting apparatus by making a comparison between groups of information for respective rows or groups of determination information for the respective rows stored in the storage means; and judgement-result outputting means for outputting a result of judgement by the judging means.

The judging means is so arranged to make a comparison between numerical values, such as average values, standard deviations, and the like, of the groups of information for the respective rows detected for a predetermined period of time by the physical-characteristic detecting apparatus or the groups of determination information for the respective rows obtained by making a determination on the information for the respective rows.

Information on the result of determination outputted by the judgement-result outputting means is arranged to include the probability of being abnormal.

In accordance with the present invention, in the device for monitoring the normal operation of a physical-characteristic detecting apparatus for chicken eggs, the physical-characteristic detecting apparatus is a weighing apparatus.

In addition, in accordance with the present invention, in the device for monitoring the normal operation of a physical-characteristic detecting apparatus for chicken eggs, the physical-characteristic detecting apparatus is a cracked-egg detecting apparatus for detecting cracks in the chicken eggs.

Furthermore, in accordance with the present invention, in the device for monitoring the normal operation of a physical-characteristic detecting apparatus for chicken eggs, the physical-characteristic detecting apparatus is a bloodspotted-egg detecting apparatus for detecting eggs contaminated with blood.

BRIEF DESCRIPTION OF DRAWINGS

FIG. 2 is a chart of standard distribution data on egg weight;

FIG. 4 is a chart of standard distribution data on the degree of cracking of eggs.

EMBODIMENTS

Figure 1:
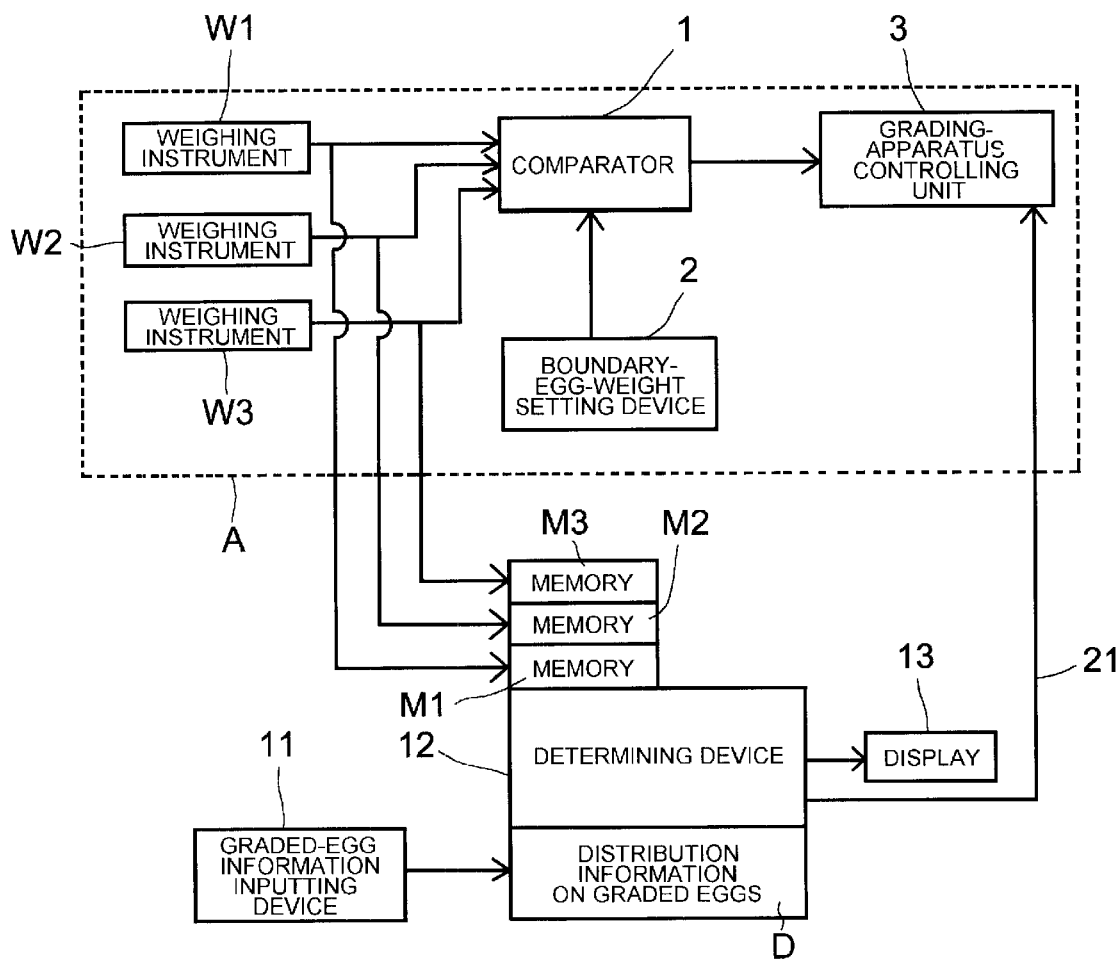
FIG. 1 is a control block diagram of a preferred embodiment of the invention.

FIG. 1 is a control block diagram of an embodiment in which the present invention is applied to a weight grading apparatus A for chicken eggs. The weight of individual eggs to be graded is measured by a weighing instrument immediately before being transferred from a feed conveyor to a transport conveyor. Weighing instruments are present for the respective egg rows of feed conveyors, and since there are three egg rows in this example, these weighing instruments for the egg rows will be consecutively denoted by W1, W2, and W3. The weighing instrument W1, the weighing instrument W2, and weighing instrument W3 effect the weighing of eggs in the first row, the second row, and the third row, respectively. The respective weight data concerning the first row of eggs measured by the weighing instrument W1 are transmitted to a comparator 1. The comparator 1 determines egg sizes such as large (L), medium (M), and small (S) which are set in advance by a boundary-egg-weight setting device 2 in correspondence with the egg weight, and transmits their size signals to a grading-apparatus controlling unit 3. Since the foregoing is generally known as the weight grading apparatus for chicken eggs, a more detailed description of the relevant portion will be omitted.

Next, the weight data on the eggs measured by the respective weighing instruments W1, W2, and W3 are inputted to and stored in memories M1, M2, and M3 of a determining device 12.

In addition, standard distribution data D on egg weight are inputted in advance into the determining device 12 according to types of chicken age in days (e.g., 200 days old, 300 days old) and types of chicken (e.g., Nagoya cochin). Generally, as for the weight of the eggs, it is known that the central value of the weight of eggs laid (central egg weight) changes little by little depending on the chickens' age in day. FIG. 2 is a chart of standard distribution data D on the egg weight of 300-day-old chickens, according to which the L size is most numerous in the determination by type of size, and the central egg weight is 65.5 g (strictly speaking, however, the central egg weight slightly differs depending on the type of chicken).

A graded-egg information inputting device 11 instructs the determining device 12 that the relevant graded eggs are eggs laid by 300-day-old chickens.

In response, the determining device 12 makes a comparison between the egg-weight distribution data concerning each of the egg rows stored in the memories M1, M2, and M3 and the standard distribution data D on the weight of eggs laid by 300-day-old chickens. Namely, if the distribution data on the weight of the first row of eggs consecutively measured by the weighing instrument W1 collates with the standard distribution data D on the weight of eggs laid by 300-day-old chickens, there is an extremely high probability that the weighing instrument W1 is operating normally. In such a case, it is rational to judge that the weighing instrument W1 is operating normally. However, in the determination of the collation of data, it is preferable to provide a fixed allowance. In contrast, if the distribution data on the weight of the second row of eggs consecutively measured by the weighing instrument W2 does not collate with the standard distribution data D on the weight of eggs laid by 300-day-old chickens within the range of the fixed allowance, there is a high probability that the weighing instrument W2 is abnormal. Accordingly, in such a case, it is estimated that the weighing instrument W2 is abnormal.

In the above-described case, the standard distribution data D concerning the egg weight are inputted in advance as data serving as a reference for comparison in the determination of the abnormality of each weighing instrument. However, instead of or in conjunction with these data, egg-weight distribution data on the same graded eggs (e.g., eggs from the same poultry house) obtained on the previous day may be used as the reference data for comparison.

In addition, in the weight grading apparatus shown in FIG. 1, an arrangement may be provided such that in a case where weight signals of identical values or approximate values are consecutively transmitted from the weighing instrument W1, the determining device 12 estimates that there has been an abnormality in the weighing instrument W1. For example, in a case where the average value m of the egg weight was 63 g and the standard deviation $\sigma$ was 12 g as a result of measurement of the egg weight, under the assumption that the weight distribution of the eggs is based on a normal distribution the probability of the weight X of an arbitrarily fetched egg falling within the range indicated below is as follows. Namely, as for the probability of the weight X of an arbitrarily fetched egg falling within $61.8 \leq X \leq 64.2$, since m=63 and $\sigma$=12, 61.8=m−0.1$\sigma$, and 64.2=m+0.1$\sigma$, so that the probability is 0.0796. Accordingly, the probability of the eggs of the weight falling within this range passing through the weighing instrument twice in succession is $6.34 \times 10^{-3}$, and the probability of such eggs similarly passing through it three times in succession is $5.04 \times 10^{-4}$. Further, the probability of such eggs passing through it four times in succession is $4.01 \times 10^{-5}$. Accordingly, in a case where the probability of occurrence is thus very low, it yields a high likelihood of coinciding with the fact to estimate that the abnormality rather lies in the weighing instrument which detected the numerical value serving as that basis, and it can be said that it is a rational determination.

If the determining device 12 estimates that the weighing instrument W1 is abnormal, the determined data is displayed on the screen of a display 13. At that time, a display may be simply given that "the weighing instrument W1 is faulty," or a display may be given that "the probability of fault is __ __%." In addition, the percentage may be classified in advance into ranks, and displays may be given on the screen as "Large Trouble," "Medium Trouble," and "Small Trouble" in a descending order starting with the rank of the highest probability.

In addition, in the case of "Large Trouble," the determining device 12 may not only give an alarm by the display 13 but may also issue an electrical signal 21 for an emergency stop to the grading-apparatus controlling unit 3.

Further, the abnormality of the weighing instrument W1 may be notified by the sounding of a warning buzzer for notifying an abnormality or by the lighting or flashing of a lamp indicating an abnormality.

As another embodiment, it is conceivable to estimate an abnormality of each weighing instrument by comparing numerical values which have been consecutively stored for the respective weighing instruments, such as the average values or standard deviations of egg weight. For example, since it is an identical group of eggs (e.g., eggs of 300-day-old chickens) that are inspected by the weighing instrument during a certain time band, it is possible to estimate an abnormality of each weighing instrument by relatively comparing the average values of the weight of eggs in the egg rows measured by the respective weighing instruments. The more numerous the number of eggs measured for the egg rows, the more approximate the average values of the egg weight in the egg rows should naturally be. In the case of a weighing instrument whose average value is relatively not approximate, e.g., if it is assumed that such a weighing instrument is the weighing instrument W3, the probability of an abnormality being present in the weighing instrument W3 is substantially high. It is thus possible to estimate an abnormality of the weighing instrument by relatively comparing the average values among the weighing instruments. Nevertheless, the possibility cannot be denied that the abnormality is present not in the weighing instrument W3 but rather in one of the weighing instruments W1 and W2 whose average values are approximate. Accordingly, to effect monitoring with higher accuracy, information on the graded eggs, e.g, the information that the eggs are those laid by 300-day-old Nagoya cochins, is imparted by the graded-egg information inputting device 11. If the numerical value of the average value of the weighing instrument W3 is close to the average value of the standard weight of eggs laid by 300-day-old Nagoya cochins, the likelihood of an abnormality being present in the weighing instrument W1 or W2 instead of the weighing instrument W3 becomes fairly large. Accordingly, in such a case, instead of estimating that either one of the weighing instrument W3 and the weighing instrument W1 or W2 is abnormal, it is rational to give a display to the effect that, for instance, "The probability of the weighing instrument W1 or W2 being abnormal is 60%, and the probability of the weighing instrument W3 being abnormal is 30%."

Although the present invention has thus far been described by citing the embodiment of grading by weight by using weighing instruments, a description will be given below of another embodiment in which the present invention is applied to a cracked-egg detecting apparatus.

Figure 3:
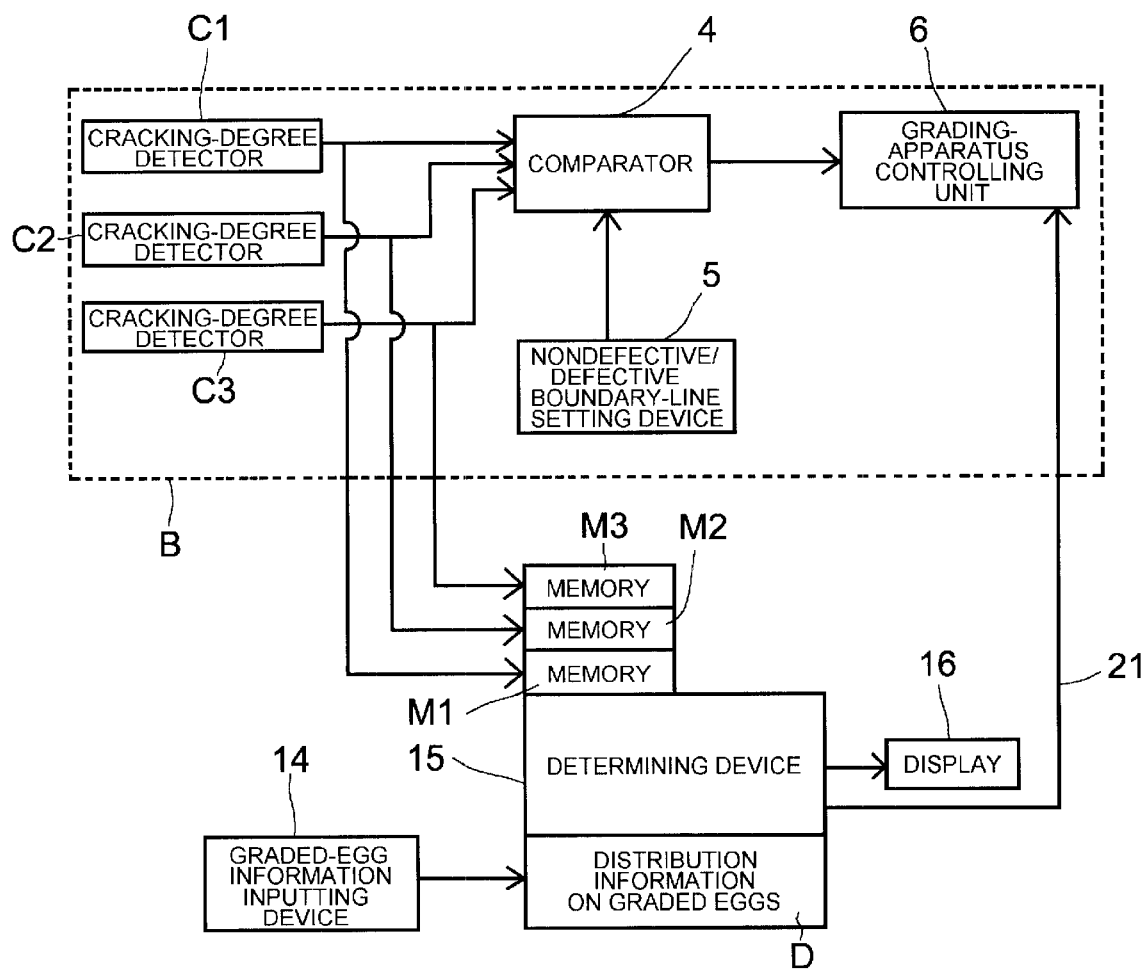
FIG. 3 is a control block diagram of another embodiment.

FIG. 3 is a control block diagram of the embodiment in which the present invention is applied to a cracked-egg detecting apparatus B. The degree of cracking of individual eggs to be graded is detected by cracking-degree detectors. The cracking-degree detectors are present for the respective egg rows of feed conveyors, and these cracking-degree detectors for the egg rows will be consecutively denoted by C1, C2, and C3. The cracking-degree detector C1, the cracking-degree detector C2, and the cracking-degree detector C3 detect the degrees of cracking of eggs in the first row, the second row, and the third row, respectively. The degrees of cracking are classified in advance into a rank 0 to a rank 10 depending on the degree. The rank 0 indicates an egg in which no crack can be recognized, and thereafter the degree of cracking increases each time the rank becomes higher by one. The rank 10 indicates an egg in the entire surface of which cracks have occurred, with the result that irregularities are present in the entire surface.

Data on the degrees of cracking of eggs in the respective egg rows consecutively detected by the detectors C1, C2, and C3 are inputted to and stored in the memories M1, M2, and M3 of a determining device 15.

Of the ranks 0 to 10 of the degree of cracking, a certain rank is arbitrarily selected and set by a nondefective/defective boundary-line setting device 5. Consequently, ranges of the so-called normal eggs and the so-called cracked eggs are set. For example, if the rank 4 is arbitrarily selected and set by the nondefective/defective boundary-line setting device 5, the ranks 0 to 4 are set in the range for being processed as normal eggs, while the ranks 5 to 10 are set in the range for being processed as the so-called cracked eggs. The data on the degrees of cracking of the eggs in the first row detected by the cracking-degree detector C1 are transmitted to a comparator 4. The comparator 4 compares the rank of the degree of cracking which has been arbitrarily selected in advance by the nondefective/defective boundary-line setting device 5 with each signal representing the aforementioned degree of cracking from the cracking-degree detector, determines whether the individual graded eggs are the so-called normal eggs or the so-called cracked eggs, and transmits their determination signals to a grading-apparatus controlling unit 6. The foregoing is generally known as the cracked-egg detecting apparatus B.

FIG. 4 is a chart of standard distribution data D of the degree of cracking of the graded eggs based on the statistical analysis of experimental results (strictly speaking, however, the standard distribution of the degree of cracking slightly differs depending on the age in day of the chickens). The aforementioned chart of standard distribution data D of the degree of cracking is inputted in advance into the determining device 15.

A graded-egg information inputting device 14 transmits such as information on the age in day of the relevant graded eggs to the determining device 15. In response, the determining device 15 estimates an abnormality of each cracking-degree detector by comparing and collating data on the degree of cracking for the respective egg rows, which have been consecutively detected and transmitted by each of the detectors and have been stored, with the standard distribution data D on the degree of cracking which have been inputted in advance.

Although, in the above, comparison and collation are made between the cracking-degree distribution data of each egg row and the standard distribution data D, instead of comparing and collating these items of data only the rate of occurrence of cracked eggs, which are recognized by arbitrarily selecting and setting a rank of the degree of cracking, may be compared and collated by the nondefective/defective boundary-line setting device 5. For example, if the rank 5 of the degree of cracking is arbitrarily selected and set by the nondefective/defective boundary-line setting device 5, a standard rate of occurrence of cracked eggs of 5.67% is calculated from the standard distribution data D on the degree of cracking. Meanwhile, the so-called rate of occurrence of cracked eggs, Y, which is recognized by setting a rank of the degree of cracking, is also calculated from the cracking-degree distribution data of the cracking-degree detector C1. If the latter rate of occurrence, Y, collates with the standard rate of occurrence of cracked eggs of 5.67% in the aforementioned standard distribution data D within a fixed range of allowance, it is estimated that there is no abnormality in the relevant cracking-degree detector C1. In contrast, unless the numerical values of the two rates of occurrence collate with each other with the fixed range of allowance, it is estimated that the cracking-degree detector C1 is abnormal.

In addition, in the determining device 15 shown in FIG. 3, instead of or in conjunction with the standard distribution data D on the degree of cracking, cracking-degree distribution data on the same graded eggs obtained on the previous day may be used as a reference for comparison.

Further, if a number of the so-called cracked eggs, which are recognized by arbitrarily selecting and setting a certain rank of the degree of cracking, have occurred in succession in the egg row of a particular cracking-degree detector, the determining device 15 may estimate that the relevant cracking-degree detector is abnormal.

If the determining device 15 estimates that the cracking-degree detector C1 is abnormal, the determined data is displayed on the screen of a display 16. At that time, a display may be simply given that "the cracking-degree detector C1 is faulty," or a display may be given that "the probability of fault is _ _%." In addition, the percentage may be classified in advance into ranks, and displays may be given on the screen as "Large Trouble," "Medium Trouble," and "Small Trouble" in a descending order starting with the rank of the highest probability.

In addition, in the case of "Large Trouble," the determining device 15 may not only give an alarm by the display 16 but may also issue the electrical signal 21 for an emergency stop to the grading-apparatus controlling unit 6.

Further, the abnormality of the cracking-degree detector C1 may be notified by the sounding of a warning buzzer for notifying an abnormality or by the lighting or flashing of a lamp indicating an abnormality.

Next, a description will be given of a case in which the present invention is applied to a bloodspotted-egg detecting apparatus C for detecting eggs contaminated with blood.

Figure 5:
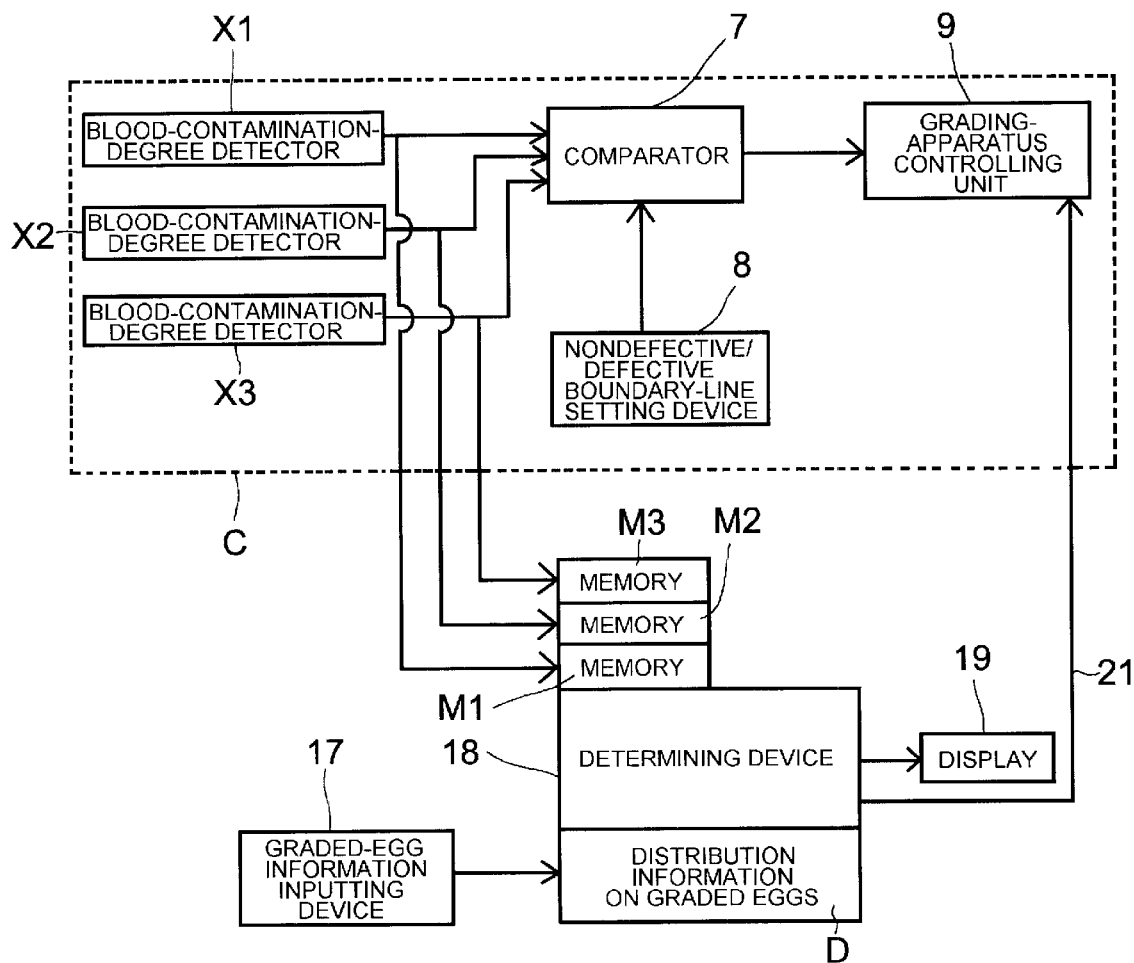
FIG. 5 is a control block diagram of still another embodiment.

FIG. 5 is a control block diagram of an embodiment in which the present invention is applied to the bloodspotted-egg detecting apparatus C. The degrees of contamination with blood in eggs are determined in advance according to the amount of blood mixed in the eggs, and the degrees of contamination with blood are classified into a rank 0 to a rank 10. The rank 0 indicates an egg in which no blood can be recognized, and thereafter the amount of blood mixed in increases each time the rank becomes higher by one. The rank 10 indicates an egg in the entire surface of which blood is mixed in. The degree of contamination with blood in individual graded eggs is detected by a blood-contamination-degree detector. The blood-contamination-degree detector uses a spectroscope to detect an iron content in the blood and determines the degree of contamination with the blood. The blood-contamination-degree detectors are present for the respective egg rows of feed conveyors, and these blood-contamination-degree detectors for the egg rows will be consecutively denoted by X1, X2, and X3. The blood-contamination-degree detector X1, the blood-contamination-degree detector X2, and blood-contamination-degree detector X3 detect of the degrees of contamination with blood in eggs in the first row, the second row, and the third row, respectively.

Data on the degrees of contamination with blood in the eggs in the respective egg rows detected by the detectors X1, X2, and X3 are inputted to and stored in the memories M1, M2, and M3 of a determining device 18. The comparator 7 compares the rank of the degree of contamination with blood selected by the nondefective/defective boundary-line setting device 8 with the degrees of contamination with blood from the detectors X1, X2 and X3, and then transmits the comparison results to a grading-apparatus controlling unit 9. The foregoing is generally known as the bloodspotted-egg detecting apparatus C.

In addition, of the ranks 0 to 10 of the degree of contamination with blood, a certain rank is arbitrarily selected and set by a nondefective/defective boundary-line setting device 8. Consequently, ranges of the so-called normal eggs and the so-called bloodspotted eggs are set.

A chart of standard distribution data D of the degree of contamination with blood in eggs is inputted in advance from a graded-egg information inputting device 17 into the determining device 18, and the determining device 18 estimates an abnormality of each blood-contamination-degree detector by comparing and collating data on the degree of contamination with blood for the respective egg rows, which have been detected and transmitted by the detectors X1, X2, and X3, with the standard distribution data on the degree of contamination with blood which have been inputted in advance.

Although, in the above, comparison and collation are made between the blood-contamination-degree distribution data of each egg row and the standard distribution data D, instead of comparing and collating these items of data the rate of occurrence of the so-called bloodspotted eggs, which are recognized by arbitrarily selecting and setting a rank of the degree of contamination with blood, may be compared and collated by the nondefective/defective boundary-line setting device 8 with respect to each egg row.

In addition, the determining device 18 may use as a reference for comparison blood-contamination-degree distribution data on the same graded eggs obtained on the previous day instead of or in conjunction with the standard distribution data D on the degree of contamination with blood.

Further, if a number of the so-called bloodspotted eggs, which are recognized by arbitrarily selecting and setting a certain rank of the degree of contamination with blood, have occurred in succession in the egg row of a particular blood-contamination-degree detector, the determining device 18 may estimate that the relevant blood-contamination-degree detector is abnormal.

If the determining device 18 estimates that the detector X1 is abnormal, the determined data is displayed on the screen of a display 19. At that time, a display may be simply given that "the detector X1 is faulty," or a display may be given that "the probability of fault is ___%." In addition, the percentage may be classified in advance into ranks, and displays may be given on the screen as "Large Trouble," "Medium Trouble," and "Small Trouble" in a descending order starting with the rank of the highest probability.

In addition, in the case of "Large Trouble," the determining device 18 may not only give an alarm by the display 19 but may also issue the electrical signal 21 for an emergency stop to the grading-apparatus controlling unit 9.

Further, the abnormality of the detector X1 may be notified by the sounding of a warning buzzer for notifying an abnormality or by the lighting or flashing of a lamp indicating an abnormality.

As described above, in accordance with the present invention, it is possible to provide a normal-operation monitoring device which makes it possible to easily estimate whether a physical-characteristic detecting apparatus for chicken eggs is operating normally.

What is claimed is:

1. A device for monitoring the normal operation of a physical-characteristic detecting apparatus for chicken eggs for detecting a physical characteristic of chicken eggs which are conveyed orderly in a multiple-row arrangement, comprising:

storage means for storing information detected by said physical-characteristic detecting apparatus or determination information obtained by making a determination on the information;

judging means for monitoring the normal and abnormal operation of said physical-characteristic detecting apparatus by making a comparison between groups of information for respective rows or groups of determination information for the respective rows stored in said storage means; and judgement-result outputting means for outputting a result of judgement by said judging means.

2. The device for monitoring the normal operation of a physical-characteristic detecting apparatus for chicken eggs according to claim 1, wherein information on the result of determination outputted by said judgement-result outputting means includes the probability of being abnormal.

3. The device for monitoring the normal operation of a physical-characteristic detecting apparatus for chicken eggs according to claim 1, wherein said physical-characteristic detecting apparatus is a weighing apparatus.

4. The device for monitoring the normal operation of a physical-characteristic detecting apparatus for chicken eggs according to claim 1, wherein said physical-characteristic detecting apparatus is a cracked-egg detecting apparatus for detecting cracks in the chicken eggs.

5. The device for monitoring the normal operation of a physical-characteristic detecting apparatus for chicken eggs according to claim 1, wherein said physical-characteristic detecting apparatus is a bloodspotted-egg detecting apparatus for detecting eggs contaminated with blood.

6. The device for monitoring the normal operation of a physical-characteristic detecting apparatus for chicken eggs according to claim 2, wherein said judging means makes a comparison between numerical values, including average values of the groups of information for the respective rows detected for a predetermined period of time by said physical-characteristic detecting apparatus or the groups of determination information for the respective rows obtained by making a determination on the information for the respective rows.

7. The device for monitoring the normal operation of a physical-characteristic detecting apparatus for chicken eggs according to claim 6, wherein information on the result of determination outputted by said judgement-result outputting means includes the probability of being abnormal.

8. The device for monitoring the normal operation of a physical-characteristic detecting apparatus for chicken eggs according to claim 6, wherein said physical-characteristic detecting apparatus is a weighing apparatus.

9. The device for monitoring the normal operation of a physical-characteristic detecting apparatus for chicken eggs according to claim 6, wherein said physical-characteristic detecting apparatus is a cracked-egg detecting apparatus for detecting cracks in the chicken eggs.

10. The device for monitoring the normal operation of a physical-characteristic detecting apparatus for chicken eggs according to claim 6, wherein said physical-characteristic detecting apparatus is a bloodspotted-egg detecting apparatus for detecting eggs contaminated with blood.

* * * * *